(12) United States Patent
Falkiner et al.

(10) Patent No.: US 11,046,896 B2
(45) Date of Patent: Jun. 29, 2021

(54) PROCESS FOR REMOVING VOLATILE CONTAMINANTS

(71) Applicant: ExxonMobil Research and Engineering Company, Annandale, NJ (US)

(72) Inventors: Robert J. Falkiner, Brampton (CA); Ashok Uppal, Sarnia (CA); Luke J. Kariparampil, Spring, TX (US); Vincent A. Brunet, Sarnia (CA); Alain D. Fomo, Calgary (CA)

(73) Assignee: ExxonMobil Research & Engineering Company, Annandale, NJ (US)

( * ) Notice: Subject to any disclaimer, the term of this patent is extended or adjusted under 35 U.S.C. 154(b) by 96 days.

(21) Appl. No.: 16/218,690

(22) Filed: Dec. 13, 2018

(65) Prior Publication Data

US 2019/0184330 A1    Jun. 20, 2019

Related U.S. Application Data

(60) Provisional application No. 62/607,523, filed on Dec. 19, 2017.

(51) Int. Cl.
*C10G 33/00* (2006.01)
*B01D 3/34* (2006.01)
(Continued)

(52) U.S. Cl.
CPC .............. *C10G 33/00* (2013.01); *B01D 1/14* (2013.01); *B01D 3/346* (2013.01); *B01D 17/045* (2013.01);
(Continued)

(58) Field of Classification Search
CPC ........ B01D 1/14; B01D 3/346; B01D 17/045; B01D 19/0005; B01D 53/1425;
(Continued)

(56) References Cited

U.S. PATENT DOCUMENTS 3,397,731 A * 8/1968 Gravis ................. B01D 53/263
159/16.1
5,122,165 A * 6/1992 Wang ................. B01D 19/0005
95/158

(Continued)

FOREIGN PATENT DOCUMENTS

| EP | 2574387 A1 | 4/2013 | |
| GB | 2223960 A | 4/1990 | |
| GB | 2423088 A * | 8/2006 | .......... B01F 13/0255 |

OTHER PUBLICATIONS

The International Search Report and Written Opinion of PCT/US2018/065357 dated Mar. 1, 2019.

*Primary Examiner* — Jonathan Miller
*Assistant Examiner* — Gabriel E Gitman
(74) *Attorney, Agent, or Firm* — Glenn T. Barrett (57) ABSTRACT

A process for cleansing a liquid of volatile contaminants can be accomplished by cross flowing a liquid through a contactor vessel. As the liquid cross flows through the horizontal contactor vessel, a radial flow pattern is induced in the liquid and the liquid is contacted with a cleansing gas. As the liquid moves through the contactor vessel, contaminants enter the cleansing cross current gas percolating through the liquid. The cross current gas may then be collected and cleansed of the contaminants it collected. The cleaned cleansing gas may then be recycled back into the contactor vessel.

18 Claims, 5 Drawing Sheets

(51) Int. Cl.
*B01D 19/00* (2006.01)
*B01D 53/26* (2006.01)
*B01D 53/14* (2006.01)
*B01D 53/18* (2006.01)
*B01D 17/04* (2006.01)
*B01D 53/78* (2006.01)
*B01D 1/14* (2006.01)
*C10G 31/00* (2006.01)

(52) U.S. Cl.
CPC ..... *B01D 19/0005* (2013.01); *B01D 53/1425* (2013.01); *B01D 53/1487* (2013.01); *B01D 53/1493* (2013.01); *B01D 53/18* (2013.01); *B01D 53/78* (2013.01); *C10G 31/00* (2013.01); *B01D 53/26* (2013.01); *B01D 2257/708* (2013.01); *B01D 2257/80* (2013.01); *B01D 2259/4516* (2013.01); *B01D 2323/12* (2013.01)

(58) Field of Classification Search
CPC ....................... B01D 53/1487; B01D 53/1493; B01D 53/18; B01D 53/78; B01D 2323/12; B01D 2257/708; B01D 2257/80; B01D 2259/4516; B01D 3/343; C10G 31/00; C10G 33/00

See application file for complete search history.

(56) References Cited

U.S. PATENT DOCUMENTS

| | | | | |
|---|---|---|---|---|
| 5,202,032 | A * | 4/1993 | Shoemaker | B01D 1/14 210/702 |
| 5,451,320 | A * | 9/1995 | Wang | B01D 53/04 210/604 |
| 5,614,100 | A * | 3/1997 | Gallup | B01D 17/0202 210/665 |
| 7,740,816 | B1 | 6/2010 | St. Amant et al. | |
| 2004/0102668 | A1* | 5/2004 | Lumgair, Jr. | C07C 1/20 585/638 |
| 2009/0133577 | A1* | 5/2009 | Falkiner | C10G 33/04 95/152 |
| 2012/0080363 | A1* | 4/2012 | Evanovich | C10G 33/00 210/86 |
| 2012/0318009 | A1 | 12/2012 | Duesel, Jr. et al. | |
| 2014/0154161 | A1* | 6/2014 | Campbell | B01D 53/1468 423/228 |

\* cited by examiner

PROCESS FOR REMOVING VOLATILE CONTAMINANTS

CROSS-REFERENCE TO RELATED APPLICATIONS

This application claims priority to U.S. Provisional Application Ser. No. 62/607,523 filed Dec. 19, 2017, which is herein incorporated by reference in its entirety.

FIELD

The present disclosure relates to apparatus and methods for removing volatile containments from a liquid.

ENVIRONMENT

Over the last 20 years there has been an increasing pressure on refineries to reduce capital and operating costs while maximizing throughputs. As a result, process units are being debottlenecked and there has been a significant reconciliation of refining capacity. To be successful, these efforts must address various challenges. One challenge that must be addressed is the removal of contaminants from delivered products. Very often liquid products, such as distillates, are delivered containing various product contaminants. Liquid products are not often transported in containers completely filled with the product. Rather, any empty space is generally present above the liquid product. This empty space is generally filed with ambient air or some other gas. The gases within these empty spaces can be a source of contaminants. For example, when liquid products are manufactured in a warm climate and shipped to a cooler climate, the gases above the liquid product being transported cool. As the gases cool, components within the gases may condense and enter the liquid being transported. For instance, water vapor within the gases may cool and enter the liquid, creating a persistent water. Accordingly, liquid products manufactured in a warm climate are often received in cooler climates with a water haze. Removing the water haze requires either long term tank settling or additional drying to meet the product dryness or haze specifications at the point of delivery. Long term tank settling is time consuming and thus frustrates efforts to debottleneck at the point of the delivery. While there are faster options available, these options require infrastructure and operating costs. Consequently, employing these faster options increases capital and operating costs, making it difficult to maintain a minimal infrastructure at terminal facilities.

For instance, mole sieve or vacuum dryers are high in capital and operating expenses. Salt dryers are less energy intensive, but are large and consume salt that must occasionally be replaced, potentially interrupting normal operations. Salt dryers are also prone to other operating problems, such as salt carryover, or sudden unplanned loss of efficiency from excessive salt consumption or salt bed channeling. Most often, refineries end up with a "swing" dryer to protect against unplanned outages, increasing the capital cost and footprint.

Maintaining a small footprint at terminal facilities make it difficult to remove volatile contaminants via gas drying. The traditional design of gas dryers utilizes a vertical vacuum dryer. Vertical towers require underground infrastructures capable of withstanding wind and earthquake loads. Accordingly, a sufficient infrastructure has to be constructed beneath the tower to support the weight of the tower while preventing it from toppling. Vertical towers additionally need to be sufficiently reinforced to withstand their own weight and the weight of material within them. As the height of material within a tower increases, so does the amount of pressure exerted against the lower walls of the tower by the material. Thus, vertical towers have to be sufficiently reinforced to avoid toppling, buckling from their own weight, and to withstand internal pressure generated by the weight of material within the tower. Additionally, the effluent gas can contain equilibrium quantities of light hydrocarbons from the stream being dried. Often this requires the effluent gas to be combusted or recycled through a refinery process, which can introduce other operating costs. Additionally, recycling the gas effluent can reduce overall refining capacity. Often the gas effluent recycle process is in a different area of the refinery operations, resulting in problems during unit shutdowns or upsets.

Of course, other contaminants besides water may condense and contaminate the liquid product during transport. Potential contaminants in the gases above the liquid product during transport will be equilibrium with contaminants within the liquid. The equilibrium is dependent upon temperature. At higher temperatures, more of the volatile contaminants will be in the gas above the product liquid. Conversely, as the temperature decreases more of the volatile contaminants will be present in the product liquid. As such, contaminants other than water may condense and enter the liquid product during transport from warm to cooler climates.

SUMMARY

A low-cost process for cleansing a liquid of volatile contaminants can be accomplished by cross flowing a liquid through a contactor vessel. As the liquid to be cleansed of contaminants cross flows through the horizontal contactor vessel, the liquid is contacted with a cleansing gas introduced cross current to the flow of the liquid through the contactor vessel. Simultaneously, the cross flowing liquid begins to move towards the periphery of the horizontal contactor vessel creating a radial flow in the liquid and a near plug flow of the liquid through the contactor vessel. As the liquid moves through the contactor vessel, contaminants enter the cleansing cross current gas percolating through the liquid. The cross current gas may then be collected and cleansed of the contaminants it collected. The cleaned cleansing gas may then be recycled back into the contactor vessel. The liquid to be cleansed may by any liquid or liquefied hydrocarbon, such as liquefied petroleum gas, gasoline, diesel, refinery component streams, distillates, gas oils, crude oils and/or emulsions. The volatile contaminants that may be cleansed from liquid include any undesirable element within the cross flowing liquid that can be absorbed and/or dissolved in the cleansing cross current gas percolated through the liquid. In some instance, the volatile contaminant may be water. The cross flowing liquid may be cleansed to varying degrees, depending on specific down streams requirements. Accordingly, it may only be necessary to cleanse of a portion of the volatile contaminants. For instance, when removing water from a distillate subsequent to refining, storage, and/or processing, it may only be necessary to get the liquid to a few parts per million below saturation.

Introducing a cleansing gas cross current to cross flowing liquid is to introduce the gas such that it crosses the direction of flow of the liquid. Accordingly, as the liquid to be cleansed flows through a vessel, the liquid crosses through the cleansing gas. Establishing a cross current of the cleansing gas may be accomplished by introducing the gas from a distribution grid arranged substantially parallel to the direction of flow of the liquid to be cleansed. As such, if the liquid to be cleansed flows along the longitudinal axis of a vessel, then a cross current of a cleansing gas may be established by introducing the gas from a distribution grid arranged substantially parallel to the longitudinal axis of the vessel. Given that the cleansing gas will want to move upwards through cross flowing liquid, it may be most efficient to introduce the gas along a bottom region of the contactor vessel.

Accordingly, a process for removing volatile contaminants from a liquid may comprise cross flowing a liquid through a contactor vessel comprising a longitudinal axis and a bottom region. Cross current introduction of the gas may comprise contacting the cross flowing liquid with a cleansing gas introduced at the bottom region of the contactor vessel. The cross flow of the liquid and the cross current of the cleansing may be adjusted as to induce a radial flow pattern in the cross flowing liquid. As to facilitate transfer of the volatile contaminant from the cross flowing liquid to the cleansing gas, the cleansing gas may have a percent saturation for at least one volatile contaminant lower than the cross flowing liquid. After percolating upwards through the cross flowing liquid, the cleansing is allowed to leave the contactor vessel.

Introducing a cleansing gas cross current to the flow of the liquid to be cleansed may reduce infrastructure and/or reinforcement requirements necessary for installations utilizing the process. In some instances, the reduced infrastructure and/or reinforcement requirements may enable mobile installations than may be implemented on ships and/or other vehicles. While vertical towers may be utilized, such vertical towers require underground infrastructures capable of withstanding wind and earthquake loads. Accordingly, a sufficient infrastructure has to be constructed beneath the tower to support the weight of the tower while preventing it from toppling. As the cleansing gas is introduced such that it crosses the direction of flow of the liquid to be cleansed, installations employing the process may utilize horizontally oriented contactor vessels.

The possibility of using horizontally oriented contactor vessels results from the radial flow pattern and the thermodynamic force driving transfer of the volatile contaminant to the cleansing gas from the liquid. In a traditional vacuum tower, the volatile contaminates are removed from a liquid based on differences in relative volatility. The liquid to be cleansed is heated and subjected to a vacuum providing a pressure below the vapor pressure of the contaminant to be removed. The heat and low pressure causes the volatile contaminant to evaporate and be drawn off by the vacuum. The cleansed liquid is collected at the bottom of the tower. As cleansing is driven by differences in vapor pressure, efficient cleansing requires a large exposed surface of the liquid to be cleansed. As to increase exposed surface area, the liquid to be cleansed is spread over trays and/or packing material. Of course, trays and/or packing material only provide a surface area proportional to the width of the tower. By stacking the trays and/or packing material, the amount of surface area can be increased. Thus efficient operation of vacuum towers utilizing a differences in vapor pressure to remove volatile contaminants requires a vertical arrangement to provide a sufficient operation. Rather than relying on difference in vapor pressure, contacting a cross flowing liquid with a cross current cleansing gas utilizes the difference in percent saturation between the cross flowing liquid and the cross current gas to remove volatile contaminants.

As the cross current cleansing gas percolates through the liquid, volatile contaminants enter the gas from liquid. The transfer of volatile contaminants from the cross flowing liquid to the cleansing gas is driven by the difference in percent saturation between the cross flowing liquid and the cross current cleansing gas. If the cleansing gas has a lower percent saturation for the volatile contaminant than the cross flowing liquid, the contaminant will transfer from the liquid to the gas. Accordingly, the volatile contaminant will transfer from the cross flowing liquid to the cross current gas until the percent saturation of the liquid for the contaminant becomes equivalent to the percent saturation of the gas. As such, a bubble of the cross current gas, or any other volume, percolating through the cross flowing liquid will accumulate the volatile contaminant until it reaches a percent saturation for the contaminant equivalent to that of the cross flowing liquid. When the percent saturation of the bubble becomes equivalent to that of the cross flowing liquid, no further net transfer will occur. Absent the radial flow pattern, this could create strata of contaminant concentration in the contactor vessel, with the upper strata having the most contaminant. As bubbles of the cleansing gas percolate upwards through the strata, they will eventually reach an elevation above which they cease cleansing the liquid of the volatile contaminant. If liquid was still, this elevation would increase over time as the liquid near the bottom of the vessel became cleaner. However, cleansing a still liquid would require bottleneck producing batch processing. Batch processing can be eliminated by arranging the contactor vessel vertically. Arranging the contactor vessel vertically as a tower would allow the liquid to the cleansed to be counter flowed through the gas. That is, the liquid to be cleansed would enter the vertical vessel from the top and be withdrawn from the bottom. Simultaneously, the cleansing gas would be released from the bottom of vertical vessel and percolate upwards through the liquid. Such a counter current introduction of gas within a vertical vessel would cause the elevation at which cleansing ceased to remain constant. However, any vertical arrangement of the contactor vessel would require infrastructure and/or reinforcement.

Batch process may also be eliminated without the need for extensive reinforcement and/or infrastructure by arranging the contactor vessel horizontally. As the liquid to be cleansed flows through a horizontal contractor vessel, the elevation at which cleansing ceases will increase as the liquid travels further through the vessel, causing the lower strata to become increasingly cleansed. As such, cleansing gas introduced further along a horizontal contactor vessel will gain less contaminant as it percolates through the lower strata. Eventually, the lower strata will become sufficiently cleansed such that cleansing gas reaching the upper strata will have a low enough saturation for the contaminant to cleanse the upper strata. As such, sufficiently cleansing a liquid of contaminates would require passing the liquid through a sufficiently long contractor vessel so that cleansing gas having a lower equivalent contaminant concentration reaches the upper the strata. However, the radial flow pattern induced in the cross flowing liquid transforms such strata in the cross flowing liquid into plugs. That is the cross current introduction of the cleansing gas may induce a radial flow pattern in the cross flowing liquid creating a near plug flow. The near plug flow disruption of the strata maintains the driving force of transfer along the contactor vessel.

Inducing a radial flow pattern in the cross flowing liquid causes vertical movement of the cross flowing liquid. Because of the vertical movement, cleaner liquid moves up and more contaminated liquid moves down. That is as the liquid cross flows through the contactor vessel cleaner liquid moves forward and up while more contaminated moves forward and downwards to the bottom region of the vessel. The downward movement of the more contaminated liquid limits the amount of the cross flowing liquid a volume of the cleansing gas must pass through before accumulating an equivalent saturation of contaminant. This, maintains the efficiency of the cleansing gas along the contactor vessel. Accordingly, the radial flow pattern induced in the cross flowing liquid allows efficient removal of contaminants without passing a bubble, or any other volume of the cross current gas, upwards through a large volume of liquid to be cleansed. Rather than having to percolate through a volume of liquid, the cleansing gas is immediately brought into contact with contaminated liquid. As the transfer of the contaminant from the liquid to the cleansing gas is driven by a difference in saturation between the cross current cleansing gas and the cross flowing liquid, bringing the gas into immediate contact with more contaminated cross flowing liquid increases the initial driving force of the transfer along the length of the contactor vessel. As such, a volume of gas percolating upwards at any point along the contactor vessel more quickly establishes an equivalent saturation to that of the liquid. Accordingly, inducing a radial flow pattern in the cross flowing liquid enables the process to be employed in a substantially shorter horizontally oriented contactor vessel. Furthermore, the radial flow pattern induced in the cross flowing liquid to be cleansed confines back mixing to a small area near the exit end. Confining back mixing reduces the penalty paid for a horizontally oriented contactor vessel.

Accordingly, the process may be carried out utilizing a horizontal cross flow contactor configured to permit a cross flow of a liquid to be cleansed. The cross flow contact vessel may comprise a first end, a second end opposite the first end, a longitudinal axis, and a bottom region. The liquid to be cleansed may enter the contactor vessel through a liquid inlet at the first end of the horizontal contactor vessel and exit at a liquid outlet at the second of the horizontal contractor vessel. As the liquid cross flows through the vessel a cleansing gas distribution grid within the bottom region of the horizontal contactor vessel, that is disposed within a central area on a cross section of the horizontal contactor vessel parallel to the longitudinal axis of the horizontal contactor vessel, introduces a cross current cleansing gas into the liquid. After percolating through the cross flowing liquid, the gas may exit a gas outlet within an upper region of the horizontal contactor vessel.

Orienting the contactor vessel horizontally may remove many of the engineering challenges associated with vertical towers. Instead of a reinforced infrastructure, a horizontally oriented contactor vessel may be supported with crushed rocks, a simple concrete pad, and/or other rudimentary structures. Additionally, the horizontal orientation of the contactor vessel reduces the vertical weight of the vessel. Thus, orientating the contactor vessel horizontally reduces the need to reinforce the walls of the vessel. The reduced reinforcement and/or rudimentary infrastructure may enable installations utilizing a horizontally oriented contactor vessel to be portable and/or temporary. Additionally, the reduced infrastructure and/or reinforcement requirements may enable the use of such installations on ships and/or other vehicles.

In addition to temporary and/or mobile installations, the process may provide installations having reduced operating costs. Some installations and/or applications of the process may be configured to provide reduced cost and/or mobile installations by optimizing the radial flow pattern in the cross flowing liquid. Inducing movement liquid to be cleansed towards the periphery of the contactor vessel may be used to optimize the radial flow pattern in some applications. The radial flow pattern may be optimized in some applications by introducing the cleansing gas from a central area on a cross section of the contactor vessel substantially parallel to the longitudinal axis of the contactor vessel. Limiting the area of the introduction of the cleansing gas such that the cleansing gas is introduced from approximately fifty percent of a cross section of the contactor vessel substantially parallel to the longitudinal axis of the contactor vessel may be utilized in some applications to optimize the radial flow pattern. In some applications, the radial flow pattern may be optimized by introducing the cleansing gas in the form of a plurality of bubbles. The radial flow pattern may be optimized by utilizing various combinations of these techniques.

Inducing a radial flow pattern permitting vertical movement in a cross flowing liquid may establish at least a near plug flow of the liquid to be cleansed through the contactor vessel, without the use of any internal component other than a gas distribution grid. Additionally, the radial flow pattern confines back mixing along substantially the entire length of the contact vessel. Confining back mixing and permitting vertical movement of the cross flowing liquid, the radial flow pattern enables the cross current gas percolating upwards to continually cleanse the cross flowing liquid of contaminants along substantially the entire length of the vessel. As such, the cross current gas exiting the liquid will not drop below the saturation of the cross flowing liquid along substantially the entire length of the liquid cross flow. It may, therefore, be desirable to optimize the gas distribution grid to provide a radial flow pattern. In some horizontal cross flow contactors a gas distribution comprising a plurality of bayonet spargers arranged substantially parallel to at a portion of the longitudinal axis of the horizontal contactor vessel may optimize the radial flow pattern. Each bayonet sparger may comprise a longitudinal axis, a non-porous body, and a porous portion substantially parallel with the longitudinal axis of the bayonet sparger. Utilizing bayonet spargers in which the porous portion comprise pores of approximately 5-100 microns in size may further optimize the radial flow pattern. In some horizontal contactor vessels the radial flow pattern may be optimized by confining the gas distribution grid to a central area comprising approximately fifty percent of the cross section of the horizontal contactor vessel parallel to the longitudinal axis. The radial flow pattern may be optimized by utilizing various combinations of these features.

Inducing a radial flow pattern in the cross flowing liquid changes horizontal contactor vessel from a single stage, continuously stirred reactor to a multiple stage, cross flow reactor, which approaches the thermodynamic efficiency of a full counter current reactor. This reactor transformation lowers the gas requirements of the cleansing cross current gas. Cross flow followed by a radial flow pattern reduces gas requirement by creating a high contact efficiency. The resulting high contact efficiency may minimize the amount and/or purity of the cross current gas needed to remove volatile contaminants from the liquid to be cleansed. Transfer of a volatile contaminant from the cross flowing liquid to the cross current cleansing gas is driven by the difference in saturation between the liquid and the gas. Increasing the contact efficiency increases the opportunity for such transfers within the contactor vessel. Thus, as long as the cross current of the cleansing gas has a lower equivalent percent saturation than the liquid to be cleansed, increasing the contact between the cross flowing liquid to be cleansed and the cross current gas will increase transfer of the contaminant from the liquid to the gas. Accordingly, a cross flowing liquid may be cleansed to 75% saturation by a cross current of gas having 74% saturation for the contaminant. As the gas cross current gas does not need to be especially pure, it may not be necessary to heat and/or filter the gas prior to introduction into the cross flowing liquid to be cleansed. As it may not be necessary to heat and/or filter the gas, operating expenses may be decreased. Accordingly, in some installations untreated ambient air may be a sufficient cross current gas to cleanse a cross flowing liquid of contaminant. Furthermore, as increasing the contact efficiency increases transfer, it may be desirable to leave head room above the cross flowing liquid to be cleansed and to create a foam of cross flowing liquid above the cross flowing liquid. The high surface area of the foam may provide increased contact efficiency.

The ability to use ambient air and/or other untreated gases to cleanse a liquid of volatile contaminants may reduce unplanned outages and/or simplify initiation of the process. As the cross current gas need only have an equivalent percent saturation below that of the cross flowing to be cleansed, the available gases are robust. Furthermore, the process may be employed using ambient air that is more saturated for the contaminant outside of the contactor vessel. Percent saturation of a gas is dependent upon temperature. As the temperature of a gas increases, the percent saturation of the gas decreases. For instance, ambient air with a relative humidity of 100% will become drier if heated, i.e. the relative humidity will decrease when heated. If heated to a sufficient temperature very muggy ambient air will become less saturated than the cross flowing liquid to be cleansed. Being less saturated then the cross flowing liquid, water will transfer from the cross flowing liquid to the heated ambient air. Accordingly, ambient air with a 100% relative humidity outside of the contactor vessel may be used dry, i.e. remove water as a volatile contaminant, from a cross flowing liquid within the vessel. Thus, as long as a supply of ambient air, or any other suitable gas, may be maintained, the process should not need to be shut down due to loss of material.

Additionally, the ability to control contact efficiency may also protect the process from sudden loses of efficiency. Transfer of the contaminant from the cross flowing liquid to the cross current gas is driven by the difference in saturation between the liquid and the gas. As the difference decreases so does the driving force of the transfer. For instance, if the process is used to dry a liquid, i.e. remove water as a contaminant, ambient air may become less efficient with increases in humidity. Such a weather induce loss in drying capacity may be compensated for by increasing the contact efficiency. As the contact efficiency increases, so does the amount of contact between the cross current gas and the liquid. Transfer of water, or any other volatile contaminant, from the cross flowing liquid to the cross current gas occurs at the gas liquid interface. Increasing the amount will increase the interface and thus provide more opportunity for such transfers within the contactor vessel, thereby increasing efficiency. As such, altering or maximizing contact efficiency may protect installations form unplanned losses of efficiency. Optimizing the contact efficiency may be accomplished by changing the volume ratio of the gas to the liquid to be cleansed, altering bubble size of the cleansing cross current gas and/or altering the radial flow pattern. Overdriving the system to the carryover limit to provide foam may be utilized to increase contact efficiency.

Given that the driving force directing transfer of a volatile contaminant from the cross flowing liquid to the cross current cleansing gas is the difference in saturation, it may be desirable to remove at least a portion of the volatile contaminants from the cleansing gas prior to introducing the gas into the cross flowing liquid to be cleansed. Accordingly, it may be desirable reduce the percent saturation of the cleansing gas for that at least one volatile contaminant prior to contacting the cross flowing with the cleansing gas. Reducing the percent saturation of the cleansing gas may be accomplished by various means, such as, but not limited to, heating the cleansing gas, filtering the cleansing gas, percolating the cleansing gas through a solution having a lower percent saturation for the contaminant than the cleansing gas, compressing the cleansing gas and/or drying the cleansing gas.

It also may be desirable to remove at least portion of one or more volatile contaminants from the liquid prior to cleansing the liquid by contact with the cleansing gas. Accordingly, as to remove a portion of at least one volatile contaminant prior to contacting the liquid to be cleansed with the cleansing gas, the horizontal contactor vessel may comprise a coalescer operatively connected to the liquid inlet and a filter operatively connected to the coalescer.

Recycling the cleansing gas may, in some installations, reduce gas requirements for the system. In some installations, recycling the cleansing gas may provide for self-contained installations. Accordingly, it may be desirable to remove at least a portion of the volatile contaminants from the cleansing gas leaving the contactor vessel and then reintroduce the cleansed cleansing gas via the distribution grid. Removing at least a portion of the volatile contaminants from the cleansing gas leaving the contactor vessel may be accomplished by various means, such as, but not limited to, heating the cleansing gas, filtering the cleansing gas, percolating the cleansing gas through a solution having a lower percent saturation for the contaminant than the cleansing gas, compressing the cleansing gas and/or drying the cleansing gas.

When the process is used to remove water as a volatile contaminant, i.e. to dry the cross flowing liquid, the cleansing cross current gas may be recycled by drying the cleansing gas leaving the contactor vessel. In some applications, drying the cleansing gas leaving the contactor vessel may comprise percolating the cleansing gas leaving the contactor vessel through a salt solution held in a drying vessel. As the salt solution dries the cleansing gas, it may become diluted with water. It may be possible to restore diluted salt solution by removing a portion of the salt solution from the drying vessel and adding fresh salt to the solution held in the drying vessel. In some processes, drying the cleansing gas leaving the contactor vessel may be accomplished by compressing the gas.

Drying and recycling of a cleansing gas used to dry the cross flowing liquid may be accomplished utilizing a gas drying vessel comprising a bottom region, a wet gas distribution grid within the bottom region, and an upper outlet. The gas drying vessel may be operatively connected to the gas outlet of the horizontal contactor vessel as to permit wet cleansing gas leaving the contactor vessel to enter the drying vessel via the wet gas distribution grid. Such a connection may be achieved by a conduit operatively connecting the gas outlet of the horizontal contactor vessel to the wet gas distribution grid. As the wet cleansing gas released from the wet distribution percolates up through a salt solution held within the gas drying vessel, water will transfer the gas to the solution. As such, the gas exiting the upper outlet of the gas drying vessel will be drier than when it entered from the wet gas distribution grid. As to recycle the dried cleansing gas, the upper outlet of the gas drying vessel may be operatively connected to the cleansing gas distribution grid of the horizontal contactor vessel as to permit dried gas leaving the drying vessel to enter the horizontal contactor vessel via the cleansing gas distribution grid. Such a connection may be achieved by a conduit operatively connecting the upper outlet to the cleansing gas distribution grid. As to remove droplets of the salt solution form dried gas exiting the gas drying vessel, the drying vessel may have a crinkle wire mesh screen at the upper outlet. Likewise, as to remove droplets of the wet cleansing gas exiting the horizontal contactor, there may be crinkle wire mesh screen at the gas outlet of the horizontal contactor vessel.

The gas drying vessel it not particular limited. However, mobility and/or modularity of installations may be improved by utilizing a gas drying vessel similar, if not identical, to the horizontal contactor vessel. As such, the wet gas distribution grid of the drying vessel may be similar, if not identical, to the cleansing gas distribution grid. Accordingly, the wet gas distribution may plurality of spargers arranged parallel to a least a portion of the longitudinal axis of the gas drying vessel. A tote tanked operatively connected to the gas drying vessel may permit adding fresh salt to the solution held in the gas drying tank.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

The forms disclosed herein are illustrated by way of example, and not by way of limitation, in the figures of the accompanying drawings and in which like reference numerals refer to similar elements and in which.

DETAILED DESCRIPTION

Terminology

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction away from the earth's surface, and "below", "lower", "downward", "bottom" and similar terms refer to a direction towards from the earth's surface. The terms "upper" and "bottom" may also refer to relative positions above and below, respectively, the longitudinal axis of an element, component or other subject matter.

Adapted and configured: As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, and may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited. It is within the scope of the present disclosure that an individual step of a method recited herein may additionally or alternatively be referred to as a "step for" performing the recited action.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds). In FIGS. 1-5, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

Substantially: As used herein, "substantially" refers to a degree of deviation based on experimental error typical for the particular property identified. The latitude provided the term "substantially" will depend on the specific context and particular property and can be readily discerned by those skilled in the art. The term "substantially" is not intended to either expand or limit the degree of equivalents which may otherwise be afforded a particular value. Further, unless otherwise stated, the term "substantially" shall expressly include "exactly," consistent with the discussion below regarding ranges and numerical data.

In general, structures and/or features that are, or are likely to be, included in a given embodiment are indicated in solid lines in the figures, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

Description

Figure 1:
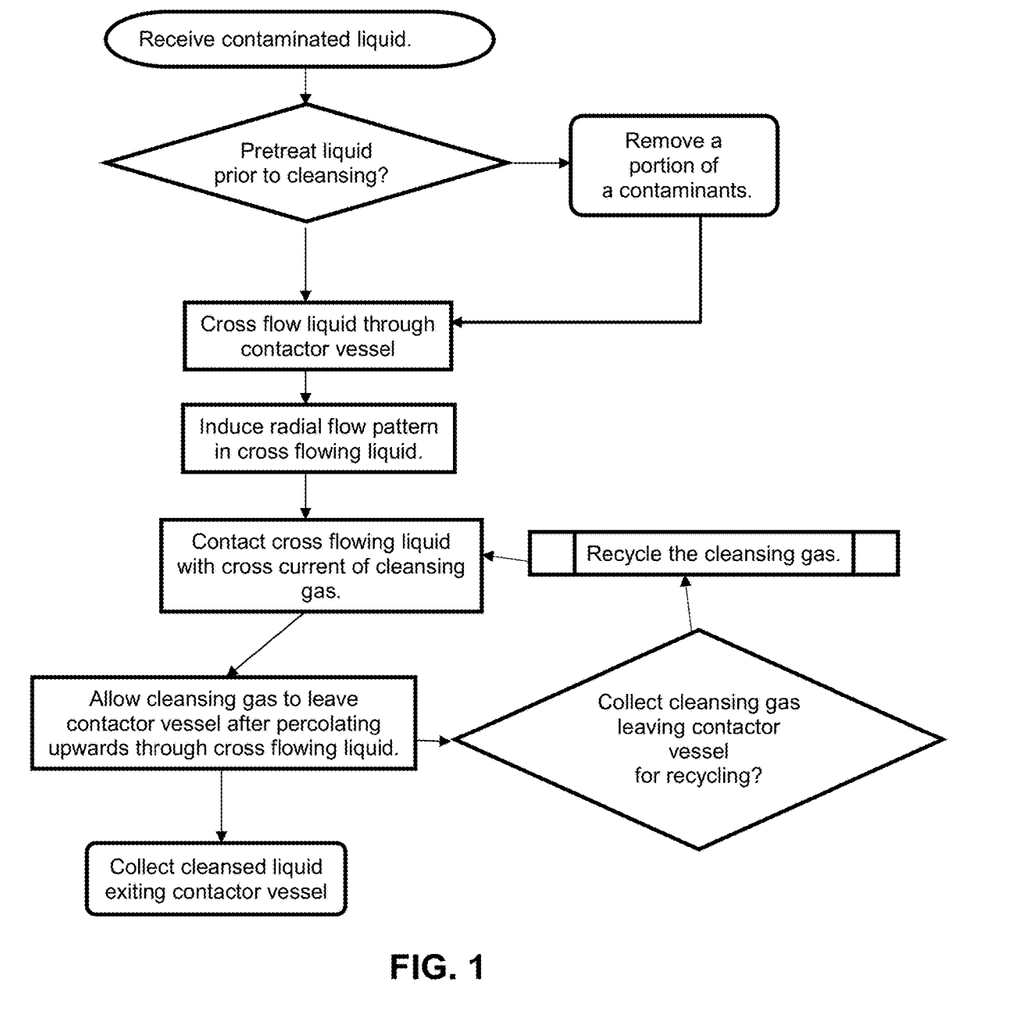
FIG. 1 is a flow chart depicting a process for removing volatile contaminants from a liquid.

A process for removing volatile contaminants from a liquid is depicted in FIG. 1. The process depicted in FIG. 1 may be implemented using all or a portion of the installation depicted in FIG. 2. The installation depicted in FIG. 2 comprises a horizontal contactor vessel 6, having a longitudinal axis 5, through which a liquid to be cleansed is cross flowed. The liquid to be cleansed of volatile contaminants may be cross flowed through horizontal contactor vessel 6 by being introduced into vessel 6 through liquid inlet 11 at first end 12 of vessel 6 and simultaneous removed through liquid outlet 9 at second end 13 of vessel 6, opposite the first end 12. The liquid to be cleansed may by any liquid or liquefied hydrocarbon, such as liquefied petroleum gas, gasoline, refinery component streams, distillates, gas oils, crude oils and/or emulsions. For instance, a hot wax may be cleansed with a single pass.

Figure 2:
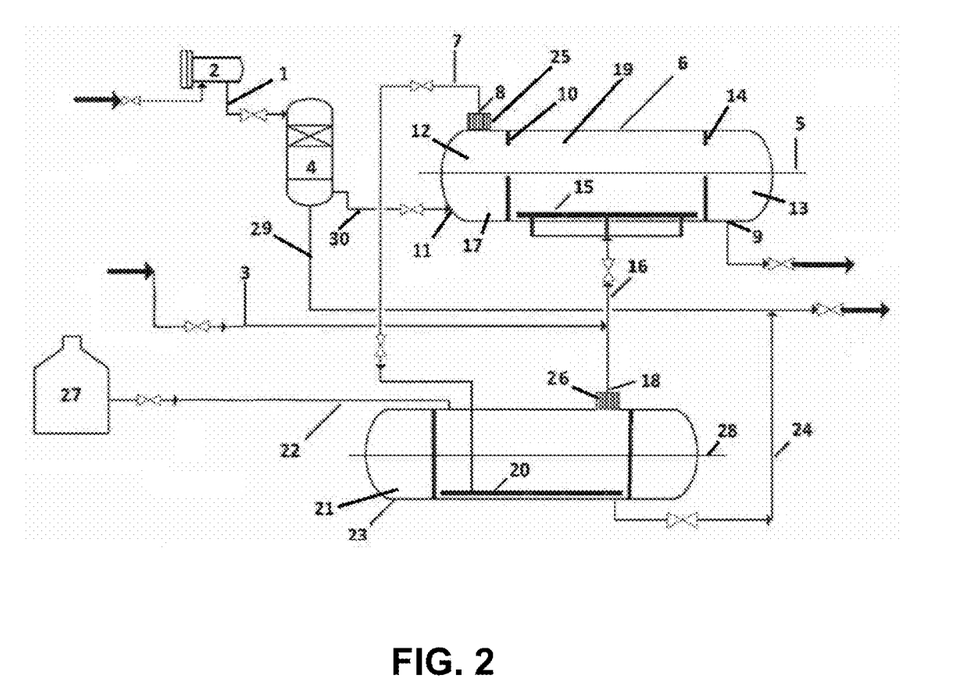
FIG. 2 is a schematic of an installation employing the process detailed in FIG. 1.

Horizontal contactor vessel 6 shown in FIG. 2 is a converted coalescer vessel having a length longer than its width. When the vessel is essentially cylindrical, the width will be its diameter. In addition to a coalescer vessel, installations may be made using other vessels having a length longer than their width. For instance, a pipe may be used as horizontal contactor vessel 6. Regardless of the specific vessel chosen, horizontal contactor vessel 6 should have a length to width ratio sufficient to operate more like a cross-flow reactor than a continuously stirred tank reactor, so that the liquid to be cleansed substantially flows in one direction through vessel 6. Sufficient cross-flow may be obtained by using a cylindrical vessel having a length to diameter ratio of approximately 4 or greater. A length to diameter ratio of approximately 8 may provide better operation. The width of the vessel to be used as vessel 6 should also be taken into account. A cylindrical vessel having a diameter of approximately 2 feet may be sufficient in some installations. Other installations may require a vessel having a diameter of 3 to 4 feet.

As shown in FIG. 2, vessel 6 is oriented horizontally. Orienting vessel 6 horizontally, such that longitudinal axis 5 is parallel to the ground, may minimize supporting infrastructure. Vertical towers, such as those utilizing a counter current to remove contaminants, require underground infrastructures capable of withstanding wind and earthquake loads. Accordingly, a sufficient infrastructure has to be constructed beneath the tower to support the weight of the tower while preventing it from toppling. Vertical towers additionally need to be sufficiently reinforced to withstand their own weight and the weight of material within them. As the height of a fluid within a tower increases, so does the amount of pressure exerted against the lower walls of the tower by the material within the tower. Thus, vertical towers have to be sufficiently reinforced to avoid toppling, buckling from their own weight, and to withstand internal pressure generated by the weight of material within the tower. Orienting vessel 6 horizontally, however, removes many of these engineering challenges. Instead of a reinforced infrastructure, the horizontally oriented contactor vessel 6 may be supported with crushed rocks, a simple concrete pad, and/or other rudimentary structures. Additionally, the horizontal orientation of contactor vessel 6 reduces the vertical weight of the liquid to be cleansed, thereby reducing the internal pressure generated by the weight of the liquid against its walls. Thus, orientating contactor vessel 6 horizontally reduces the need to reinforce the walls of vessel 6. The reduced reinforcement and/or rudimentary infrastructure may enable horizontal contactor vessel 6 to be part of a portable and/or temporary installations. Additionally, the reduced infrastructure and/or reinforcement requirements may enable the use of such installations on ships and/or other vehicles. The horizontal orientation of contactor vessel 6 making such mobile, temporary and/or portable installations possible results from induction of radial flow pattern in the cross flowing liquid and cross current introduction of a cleansing gas into the cross flowing liquid to be cleansed.

A cross flow of the liquid to be cleansed through contactor vessel 6 may be induced by introducing the liquid through an inlet on one end of the vessel 6, while removing liquid from an outlet on an opposite end. For instance, as shown in FIG. 2, liquid inlet 11 is positioned in a bottom region 17 of contactor vessel 6. Likewise, liquid outlet 9 is positioned in bottom region 17 of contactor vessel 6. Liquid inlet 11 and outlet 9 may be positioned at other locations to be configured to supply liquids to contactor vessel 6 and remove liquids passing through vessel 6, respectively. As such, when a length of pipe is used as contactor vessel 6, liquid inlet 11 and/or liquid outlet 9 may be opposing open ends of the pipe. Additionally, liquid inlet 11 and/or liquid outlet 9 may be placed in upper and/or central regions of the contactor vessel chosen.

Regardless of the orientation of liquid inlet 11 and liquid outlet 9, the liquid to be cleansed of volatile contaminants flows through vessel 6 by being supplied through liquid inlet 11 and removed through liquid outlet 9. As to better induce cross flow of the liquid to cleansed, contactor vessel 6 may include opposing partitions 10 and 14 positioned within the first end 12 and second end 13, respectively, of vessel 6. As shown in FIG. 2, partitions 10 and 14 contain openings permitting the passage of the fluid to be cleansed. The use of such partitions may not be necessary in every installation. For instance, installations in which the liquid to be cleansed is introduced and/or removed from inlets and/or outlets within central regions of contactor vessel 6 may not require partitions to induce a sufficient cross flow of the liquid to be cleansed.

Figure 7:
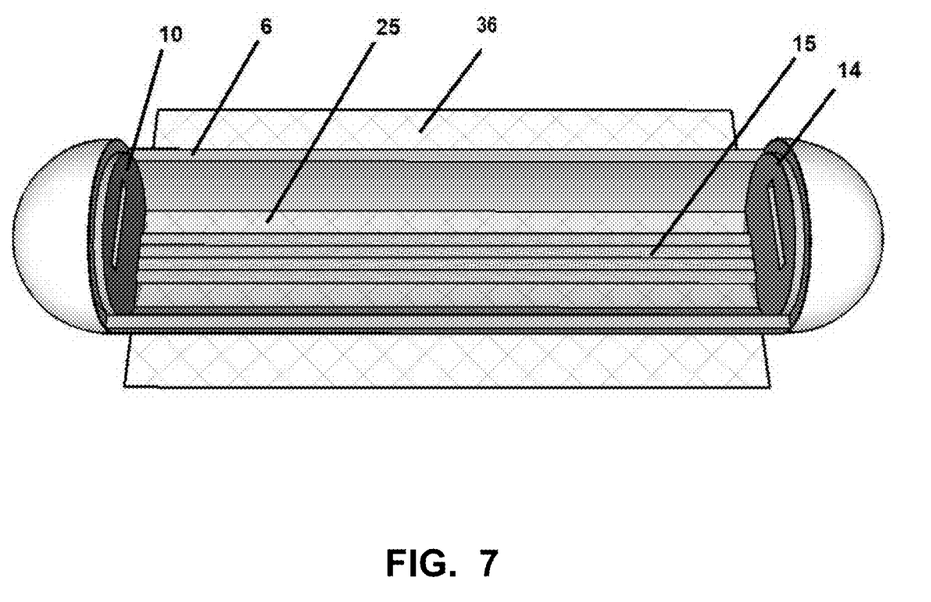
FIG. 7 is a perspective view of a contactor vessel with a portion of the vessel outer wall removed.

Contaminants are removed from the cross flowing liquid to be cleansed by contacting the liquid with a cross current cleansing gas supplied via distribution grid 15. Accordingly, a gas is utilized to remove contaminants form the liquid cross flowing through contactor vessel 6. Prior to contacting the cross flowing liquid with a cross current of the cleansing gas, a radial flow pattern may be induced in the cross flowing liquid. The cross current introduction of the cleansing gas may induce a radial flow pattern in the cross flowing liquid to be cleansed. As such, in some installations inducing a radial flow pattern in the cross flowing liquid may occur simultaneously with contacting the cross flowing with the cleansing gas. Inducing a radial flow pattern with the cross current introduction of the cleansing gas may be achieved by positioning distribution grid 15 substantially parallel to longitudinal axis 5 such that gas distribution grid 15 may be disposed within a central area on a cross section 25 of contactor vessel 6 parallel to longitudinal axis 5 and on plane 36, as shown in FIG. 7. As the liquid to be cleansed flows through drying contactor vessel 6, gas distribution grid 15 within bottom region 17 introduces a cleansing gas at the bottom region 17 of contactor vessel 6. Gas introduced via distribution grid 15 percolates upward through the cross flowing liquid within vessel 6. As the gas percolates upwards, a radial flow pattern may be induced in the liquid cross flowing through vessel 6. Regardless of how the radial flow pattern is created, the resulting cross-flow followed by a radial flow pattern of the liquid to be cleansed may provide a near plug flow of the liquid to be cleansed and/or a high contact efficiency. The near plug flow and/or high contact efficiency may minimize the amount and/or purity of the cleansing gas needed to remove volatile contaminants from the liquid to be cleansed. Additionally, the radial flow pattern may confine back mixing to regions near the outlet end. Accordingly, positioning gas distribution grid 15 to provide a cross current of the cleansing gas inducing a radial flow pattern in the cross flowing liquid may reduce the size of contactor vessel 6 and/or improve efficiency by providing a near plug flow of the liquid to be cleansed.

Cross flow followed by a radial flow pattern of the liquid to be cleansed is believed to result in the following manner. As the cleansing gas introduced through the distribution grid 15 percolates upwards, the liquid cross flowing through contactor vessel 6 moves towards the periphery of vessel 6. The cleansing gas induced peripheral movement of the cross flowing liquid induces a radial flow pattern. Accordingly, the radial flow pattern induced in the liquid cross flowing through contactor vessel 6 may comprise movement of the liquid towards the periphery of contactor vessel 6. Limiting the size of central area in which gas distribution grid 15 is disposed to approximately fifty percent of cross section 25 may also facilitate inducing the radial flow pattern in the liquid cross flowing through contactor vessel 6.

The cross current introduction of the cleansing gas into the cross flowing liquid to be cleansed may reduce the required purity of the gas utilized to remove contaminants form the liquid to be cleansed. For instance, when the liquid is to be cleansed of water (i.e. dried), the gas supplied via distribution grid 15 does not have to be very dry to achieve a water saturation of fifty to seventy-five percent within the liquid. As such, a gas having a relatively humidity of fifty percent or less may be sufficiently dry to achieve a water saturation of fifty to seventy-five percent. In other instances, a gas with a relatively humidity of one-hundred percent may be used to dry the liquid, depending on the contacting temperature. Within contactor vessel 6, transfer of a volatile contaminant from the liquid to be cleansed to the cleansing gas introduced via gas distribution grid 15 is determined by the difference between the percent saturation of the liquid and percent saturation of the gas with respect to the volatile contaminant to be removed (i.e. the ratio of the partial pressure of the contaminant in the gas to the equilibrium vapor pressure of the contaminant) at the temperature of the gas when in contacts the liquid within vessel 6. When the gas introduced via distribution grid 15 has a lower percent saturation than the liquid to be cleansed, contacting the liquid with the gas will transfer the contaminant from the liquid to be cleansed to the introduced gas. Accordingly, a liquid flowing through contactor vessel 6 may be cleansed to 75% saturation by introducing via distribution grid 15 a cross current cleansing gas having 74% saturation for the contaminant.

Figure 3:
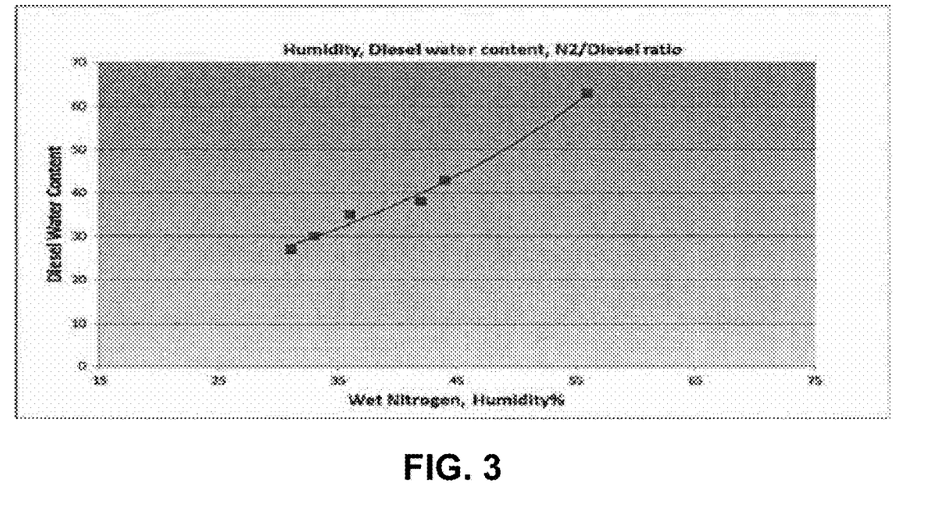
FIG. 3 presents the results of removing the contaminated water from diesel with nitrogen gases having varying percent saturation with respect to water.

Such is shown in FIG. 3, which presents the results of removing the contaminated water from diesel with nitrogen gases having varying percent saturation with respect to water. As water is the contaminant being removed, the diesel is being dried. Furthermore, the percent saturation of the nitrogen gas is the relative humidity of the gas. For each relative humidity, the diesel to be dried had an initial water content of approximately 100 wppm and the same volume of nitrogen gas was delivered to the same volume of diesel. That is, the volume ratio of nitrogen gas to diesel ratio (N2 volume:Diesel volume) remained constant. The wet diesel was cross flowed through a contactor vessel. The nitrogen gas was introduced cross current to the flow of the wet diesel through the contactor vessel. As can be seen in FIG. 3, the water content of the diesel was reduced (i.e. the diesel was dried) with nitrogen gas having a relative humidity of greater than 55%. Drier nitrogen, i.e. nitrogen having lower relative humidity, was more efficient at drying the diesel. As can also be seen from FIG. 3, the water content of the diesel tracked the relative humidity of the nitrogen gas. This indicates that the water content of the cross flowing diesel and cross current nitrogen attempt to achieve an equilibrium. Thus, as long as the cross current of the gas has a lower percent saturation than the liquid to be cleansed, contacting the liquid with the cleansing gas will transfer the contaminant from the liquid to be cleansed to the introduced cleansing gas. Accordingly, a cross flowing liquid may be cleansed to 75% saturation by a cross current of gas having 74% saturation for the contaminant. However, as the cross flowing liquid to be cleansed approaches the percent saturation of the cross current cleansing gas, the volume of gas with respect to the liquid will need to be increased.

Cleansing a cross flowing liquid based on the difference in saturation between the liquid and a cross current cleansing gas, the temperature of the cleansing gas is not necessarily important. As long as the cross current cleansing gas has a lower saturation than the cross flowing liquid, contaminants will transfer from the liquid to the cleansing gas. As such, if the cleansing cross current gas has a lower saturation than the cross flowing liquid to be cleansed, heating the cross current gas and/or the cross flowing liquid will not be necessary. The ability to use cold cross current gases and/or cross flowing liquids enables the process to be employed in moderate and/or cold climates.

Figure 4:
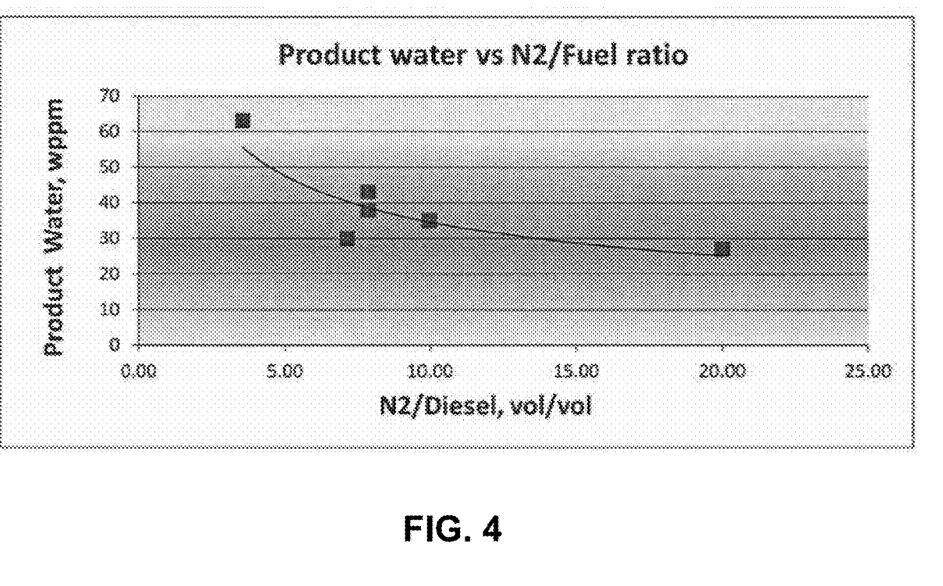
FIG. 4 reports the results of drying a cross flow of diesel having 100 wppm of water with varying volumes of nitrogen gas having a constant relative humidity.

The volume of gas necessary to achieve a particular level of saturation in the liquid to be cleansed will be dependent on the difference in saturation between the cross flowing liquid and the cross current cleansing gas introduced via distribution grid 15 for the contaminant. As the initial saturation of the liquid approaches that of the gas, a greater volume of gas will be required. This is shown in FIG. 4, which reports the results of drying a cross flow of diesel having 100 wppm of water with varying volumes of nitrogen gas having a constant relative humidity. As reported in FIG. 4, higher volume ratios of nitrogen gas to diesel provide drier diesel products. That is, as the volume of the cross current gas increases the amount of contaminants removed from the cross flowing liquid increases.

The volume of cross current gas needed to remove a certain amount of contaminant from a cross flowing liquid is also dependent upon the contact temperature of the gas. As demonstrated by FIG. 3, the saturation of the cross flowing liquid for a volatile contaminant tracks the percent saturation of the cross current gas for the contaminant. Percent saturation of the cross current cleansing gas with respect to the contaminant is a function of temperature. Accordingly, a cleansing gas having one-hundred percent saturation for a contaminant may be heated when introduced into the cross flowing liquid, thereby lowering the percent saturation of the gas below that of the liquid to be cleansed. As the heated cleansing gas will have a lower saturation then the liquid to be cleansed, the contaminant will transfer from the liquid to the gas. Accordingly, hot wax at a temperature of 140° F. may be dried using ambient air when the ambient conditions are 100° F. and 100% relative humidity. In such a scenario, the gas may be heated by contacting the hot wax. Accordingly, the cross current cleansing gas may be heated by the cross flowing liquid to be cleansed. In combination or the alternative, the cleansing gas could be heated prior to being released into the cross flowing liquid.

Enabling the use of highly saturated gases to remove contaminants from liquids, the cross current introduction of a cleansing gas into a cross flowing liquid reduces the size and/or increases efficiency of installations. The reduced size and increased efficiency may be achieved by the cross current introduction of a cleansing gas via gas distribution grid 15 into a cross flowing liquid having a radial flow pattern. In some applications, the radial flow pattern may be induced in the cross flowing liquid to be cleansed using a variety of gas distributions grids arranged substantially parallel to the longitudinal axis 5 of vessel 6. For instance, a continuous axial distribution grid may be sufficient to induce a radial flow pattern in the cross-flowing liquid to be cleansed. A distribution grid comprising multiple distributers may be better suited for large scale installations.

Figure 5:
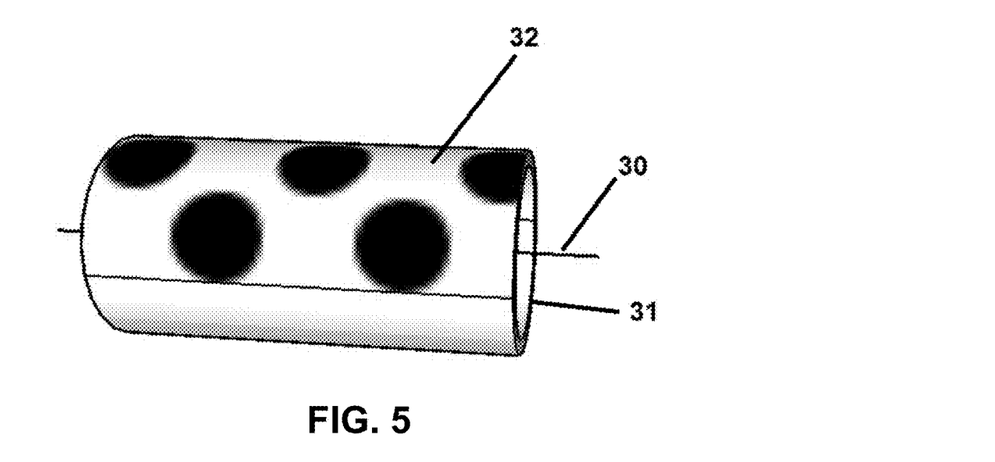
FIG. 5 is perspective view of a section of a bayonet sparger.

The cross current cleansing gas may be introduced into the liquid to be cleansed cross flowing through contactor vessel 6 in the form of a plurality of bubbles. Optimizing the size of such bubbles may optimize the radial flow pattern induced in the liquid flowing through contactor vessel 6. As such, gas distribution grid 15 may comprise a plurality of bayonet spargers arranged parallel to at least a portion of longitudinal axis 15 of contactor vessel 6. As shown in FIG. 5, each bayonet spargers of such a plurality may comprise a longitudinal axis 30, a non-porous body 31, and a porous portion 32 substantially parallel with the longitudinal axis 30 of the bayonet sparger. As to optimize the size of the bubbles, porous portions 32 of the plurality of bayonet spargers may comprise pores of approximately 5-100 microns in size. The resulting gas flow pattern may establish a near plug flow of the liquid to be cleansed, that may be achieved without the use of any internal components other than gas distribution grid 15.

Establishing at least a near plug flow changes contactor vessel 6 from a single stage, continuously stirred reactor to a multiple stage, cross flow reactor, which approaches the thermodynamic efficiency of a full counter current reactor. This reactor transformation provided by radial flow pattern in the cross flowing liquid and the cross current introduction of the cleansing gas may lower gas requirements. Accordingly, the cross current positioning of gas distribution grid 15 on a cross section of contactor vessel 6 substantially parallel to longitudinal axis 5 may improve efficiency, reduce the necessary size of vessel 6, and/or lower gas requirements. Cleansing of low vapor pressure hydrocarbons may be easiest, as there will be very little entrainment of the such liquids in the gas introduced via distribution grid 15.

After percolating through the liquid to be cleansed, the gas is allowed to leave vessel 6 through outlet 8 within upper region 19 of contactor vessel 6. As to knock out any entrained droplets of the liquid to be cleansed from the gas leaving vessel 6, a crinkle wire mesh screen 25 may be provided at outlet 8.

The cross current gas introduced via distribution grid 15 may be drawn from the ambient air. However, as shown in FIG. 3, less saturated cross-current gases are more efficient at removing contaminants from cross flowing liquids. As such, installations, such as those shown in FIG. 2, may be made more efficient by removing contaminants from the gas prior to cross current introduction of gas into the cross flowing liquid to be cleansed. Accordingly, the amount of cross current cleansing gas required to achieve a certain level of contaminant within a cross flowing liquid may be reduced by reducing the percent saturation of the gas prior to introduction into the liquid. Reducing the percent saturation of the cross current gas may be accomplished by several means, including, but not limited to, passing the gas through a molecular sieve, filtration, and percolating the gas through a liquid held in a second horizontal contactor vessel. The liquid held within the second vessel may be any liquid capable of removing contaminants from the cross current gas. For example, when the cross current gas is to be used to remove water (i.e. dry) the cross flowing liquid, a salt solution may be held within the second vessel. Accordingly, prior to introducing the cross current gas into a cross flowing liquid to be dried, the relative humidity of the gas may be reduced by percolating the gas through a salt solution held within a second vessel.

As to simplify the installation, the second vessel utilized to reduce the percent saturation of the cross current gas may be identical to the first vessel. Accordingly, the second vessel may be configured to induce a cross flow in the liquid utilized to reduce the percent saturation of the cross current gas. Additionally, the cross current gas may be introduced via a gas distribution occupying the center 50% of a cross section within a bottom region of the second vessel. The percent saturation of the cross current gas may also be reduced by a still liquid held within the second vessel. When the liquid held within the second vessel is still, it will accumulate contaminants over time. As the liquid becomes more saturated with contaminants, its efficacy of removing contaminants from the cross current gas will decrease. Accordingly, it may be necessary to periodically purge at least portion of a still liquid held within the second vessel and replace the purged portion with a fresh amount of liquid.

As shown in FIG. 2, an installation utilizing a second vessel 23 to reduce the percent saturation of the cross current gas prior to introduction into a cross flowing liquid may include conduit 16 operatively connecting upper outlet 18 of vessel 23 to distribution grid 15 of contactor vessel 6. Vessel 23 may comprise a bottom region 21 and a gas distribution grid 20 within bottom region 21. Cleansing gases may be cleansed of contaminants as the gas percolates through a liquid held with vessel 23. As cleansing gas percolates through the liquid held within vessel 23, contaminants within the gas will attempt to achieve an equilibrium with the liquid. Thus, the contaminants will move from the higher saturation fluid to the one with the lower saturation. Accordingly, as long as the cleansing gas has a higher percent saturation than the liquid within vessel 23, contaminants will be transferred from the gas to the liquid as the gas percolates through vessel 23.

After being cleansed of at least a portion of the contaminants, the cross current gas may exit vessel 23 via outlet 18 and be transported to contactor vessel 6 through conduit 16 operatively connected to distribution grid 15. As to minimize, if not eliminate, entrained liquids from the cleansed cross current gas leaving vessel 23, a crinkle wire mesh 26 may be placed at outlet 18. After exiting vessel 23, the cleansed gas may then be introduced cross current to a liquid cross flowing through contactor vessel 6. As the cleansed cross current gas percolates through the cross flowing liquid contaminants are transferred from the liquid to the gas. After percolating through the cross flowing liquid, the cross current gas may be allowed to leave contactor vessel 6 through gas outlet 8. Depending on the contaminant, cross current gas, liquid to be cleansed and/or associated environmental concerns, the gas leaving gas outlet 8 may be allowed to escape into the ambient air. In some instances, treating and/or burning the cross current gas leaving outlet 8 may be desirable. Efficiency of the installation may be improved by recycling the gas leaving gas outlet 8. Accordingly, an installation may comprise a conduit 7 operatively connecting gas outlet 8 of contactor vessel 6 to a plurality of spargers forming gas distribution grid 20 of vessel 23. Cleansing the cross current leaving contactor vessel 6 of at least a portion of its contaminants and recycling the cleansed cross current gas back into the cross flowing liquid to be cleansed may reduce operating costs of an installation. In combination or the alternative, cleansing and recycling the cross current gas may reduce the amount of gas required to operate the installation. When the cross current gas is recycled, consumption of the gas may be limited to the amount of gas dissolving in the liquid to be cleansed and the amount of gas leaking from the installation. Accordingly, consumption of the gas may be limited to the solubility of the cross current gas in the cross flowing liquid to be cleansed and/or the integrity of the installation.

For instance, when the installation is used for the purposes of drying a cross flowing liquid, improving efficiency of the installation may be accomplished by drying the cleansing gas leaving contactor vessel 6 at outlet 8 and reintroducing the dried cleansing gas through gas distribution grid 15. Drying and recycling the cross current cleansing gas leaving the cross flowing liquid to be dried may reduce operating cost of an installation. In combination or the alternative, drying and recycling the cross current gas may reduce the amount gas necessary to sufficiently dry the cross flowing liquid. For instance, when nitrogen is used as the cross current cleansing gas, drying and recycling the nitrogen may reduce the amount nitrogen required to that which can be produced utilizing a nitrogen generation membrane unit typical of those found at service garages to fill tires with nitrogen.

Figure 6:
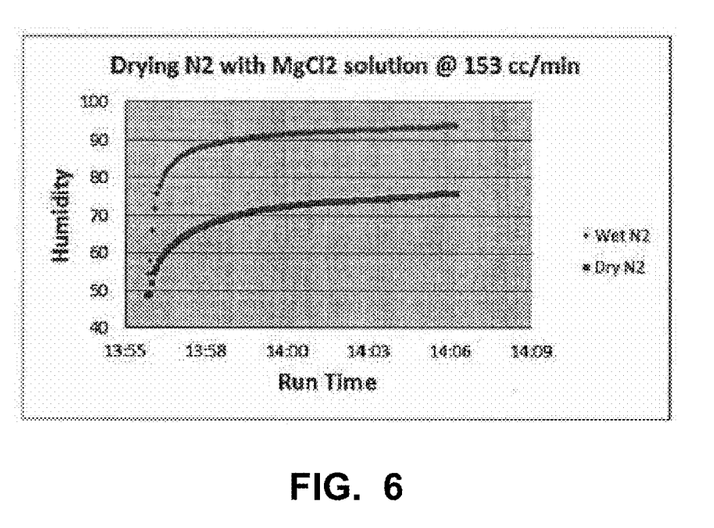
FIG. 6 reports the ability of a salt solution to dry wet nitrogen gas.

Drying recycled nitrogen cross current cleansing gas may be accomplished utilizing various means. For instance, compression induced condensation in the range of 50-150 psig may be sufficient to dry the nitrogen gas to approximately 10% to 30% relative humidity. Recycled nitrogen cross current gas may also be dried by contacting the nitrogen gas with a near-saturated salt solution to achieve 10% to 75% relative humidity. The ability of a salt solution to dry wet nitrogen is reported in FIG. 6. The experiment reported in FIG. 6 entailed percolating wet nitrogen gas through a near saturated magnesium chloride salt solution at 153 cubic centimeters per minute to provide dry nitrogen gas. As shown in FIG. 6, the relative humidity of the dried nitrogen gas tracks the initial relative humidity of the wet nitrogen gas. Additionally, wet nitrogen gas having a relative humidity of 95% was dried to approximately 75% relative humidity.

As the wet nitrogen gas percolates through the salt solution, water will be transferred from the gas to the solution. Consequently, the near-saturated salt solution will become increasingly dilute by drying nitrogen gas. In order to maintain the drying capacity of the salt solution, therefore, it may be necessary to partially purge the diluted solution and add make up salt. Make up salt may be added by introducing a volume of a saturated salt solution.

Drying a cleansing gas leaving contactor vessel 6 of the installation shown in FIG. 2 may be accomplished by percolating the gas through a drying liquid held in second horizontal contactor vessel 23. The drying liquid held within vessel 23 may be any liquid capable of removing from the cross current gas water picked up by the gas as it percolated through the cross flowing liquid to be dried. Accordingly, drying the gas leaving contactor vessel 6 may entail percolating the gas leaving vessel 6 through a salt solution held in vessel 23. Over time, the efficiency of the salt solution in drying the cleaning gas may become diminished. Adding fresh salt to the solution held in vessel 23 may restore lost drying capacity. Accordingly, it may be beneficial to at least periodically remove a portion of the salt solution from vessel 23 and add fresh salt to the remaining solution held in vessel 23. The salt may be added as a volume of a saturated salt solution. Accordingly, the installation may comprise a tote tank 27 containing a saturated solution used to replenish vessel 23. As the salt solution held within vessel 23 becomes diluted and/or after periodic operation of the process, a portion of the solution may be purged from vessel 23 via conduit 24. Simultaneously and/or after the purging of vessel 23, make up salt may be added in the form a saturated salt solution held within tote tank 27 and delivered via conduit 22. The solution purged from vessel 23 via conduit 24 may be restored by boiling water out and/or subjecting to a bleed and feed system. Other manners of removing contaminants from the solution purged from vessel 23 may also be employed. Once the purged solution has been restored, it may be recycled back into the installation.

Regardless of the liquid held within vessel 23, the gas leaving contactor vessel 6 is transmitted to vessel 23 via conduit 7 operatively connecting gas outlet 8 of contactor vessel 6 to gas distribution grid 20 within the bottom region 21 of vessel 23. After percolating through the drying liquid held within vessel 23, the gas leaves vessel 23 through upper outlet 18. Gas leaving through upper outlet 18 is then transmitted to gas distribution grid 15 of contactor vessel 6 via conduit 16 operatively connecting outlet 18 to gas distribution grid 15. In addition to recycled cleansing gas, fresh cleansing gas may be introduced to distribution grid 15 via conduit 3. As with contactor vessel 6, vessel 23 may have a longitudinal axis 28. Gas distribution grid 20 within vessel 23 may be arranged parallel to the longitudinal axis 28.

Prior to being cross flowed through contactor vessel 6, it may be advantageous to remove a portion of the volatile contaminants from the liquid to be cleansed. For instance, as shown in FIG. 2, when the liquid is to be cleansed of water (i.e. dried) it may first be passed through a filter 2 and coalescer 4, operatively connected together via conduit 1, to remove a portion of the water. The liquid to be cleansed may then be delivered from coalescer 4 to contactor vessel 6 via conduit 30. Water and/or other volatile may be removed from coalescer 4 via conduit 29 and joined with the solution purged from vessel 23. Depending on the efficiency of the coalesce and/or filter, the water content of the liquid to be dried may be reduced down to approximately 15 vppm.

Additional Embodiments

Additionally or alternately, the invention can include one or more of the following embodiments.

Processes for removing volatile contaminants may comprise any one of or combination of processes set forth in Embodiments 1 to 22.

Embodiment 1: A process for removing volatile contaminants from a liquid comprising: cross flowing a liquid through a contactor vessel having a longitudinal axis, and a bottom region; contacting the cross flowing liquid with a cross current cleansing; inducing a radial flow pattern in the cross flowing liquid; and allowing the cleansing gas to leave the contactor vessel after percolating upwards through the cross flowing liquid, wherein the crossing flow liquid has a percent saturation for at least one volatile contaminant and the cleansing gas when contacting the cross flowing liquid has a lower percent saturation for the at least one volatile contaminant than the cross flowing liquid.

Embodiment 2: The process of Embodiment 1, wherein the contactor vessel further comprises a periphery, and the radial flow pattern induced in the cross flowing liquid comprises movement of the liquid towards the periphery of the contactor vessel.

Embodiment 3: The process of Embodiment 1 or Embodiment 2, wherein contacting the cross flowing liquid with a cross current cleansing comprises introducing the cleansing gas at the bottom region of the contactor vessel along at least a portion of the longitudinal axis of the contactor vessel.

Embodiment 4: The process of Embodiment 1 to Embodiment 3, wherein the cleansing gas is introduced on a cross section of the contactor vessel parallel to the longitudinal axis of the contactor vessel.

Embodiment 5: The process of any one of Embodiment 1 to Embodiment 4, wherein the cleansing gas is introduced from a central area on a cross section of the contactor vessel parallel to the longitudinal axis of the contactor vessel.

Embodiment 6: The process of any one of Embodiment 1 to Embodiment 5, wherein the cleansing gas is introduced from approximately fifty percent of a cross section of the contactor vessel parallel to the longitudinal axis of the contactor vessel.

Embodiment 7: The process of any one of Embodiment 1 to Embodiment 6, wherein the cleansing gas is introduced in the form of a plurality of bubbles.

Embodiment 8: The process of any one of Embodiment 1 to Embodiment 7 further comprising, producing a foam of the cross flowing liquid above the cross flowing liquid.

Embodiment 9: The process of any one of Embodiment 1 to Embodiment 8, further comprising reducing the percent saturation of the cleansing gas for the at least one volatile contaminant prior to contacting the cross flowing liquid with the cleansing gas.

Embodiment 10: The process of any one of Embodiment 1 to Embodiment 9, further comprising filtering a portion of the at least one volatile contaminant from the cleansing gas prior to contacting the cross flowing liquid with the cleansing gas.

Embodiment 11: The process of any one of Embodiment 1 to Embodiment 10, further comprising heating the cleansing gas prior to contacting the cross flowing liquid with the cleansing gas.

Embodiment 12: The process of any one of Embodiment 1 to Embodiment 11, further comprising, prior to contacting the cross flowing liquid with the cleansing gas, percolating the cleansing gas through a solution having a lower percent saturation for the at least one volatile contaminant than the cleansing gas.

Embodiment 13: The process of any one of Embodiment 1 to Embodiment 12, further comprising compressing the cleansing gas prior to contacting the cross flowing liquid with the cleansing gas.

Embodiment 14: The process of any one of Embodiment 1 to Embodiment 13, further comprising drying the cleansing gas prior to contacting the cross flowing liquid with the cleansing gas.

Embodiment 15: The process of any one of Embodiment 1 to Embodiment 14, further comprising filtering a portion of the at least one volatile contaminant from the cleansing gas leaving the contactor vessel.

Embodiment 16: The process of any one of Embodiment 1 to Embodiment 15, further comprising heating the cleansing gas leaving the contactor vessel.

Embodiment 17: The process of any one of Embodiment 1 to Embodiment 16, further comprising percolating the cleansing gas leaving the contactor vessel through a solution have a lower percent saturation for the at least one volatile contaminant than the cleansing gas.

Embodiment 18: The process of any one of Embodiment 1 to Embodiment 17 further comprising compressing the cleansing gas leaving the contactor vessel.

Embodiment 19: The process of any one of Embodiment 1 to Embodiment 18, further comprising drying the cleansing gas leaving the contactor vessel.

Embodiment 20: The process of Embodiment 19, wherein drying the cleansing gas leaving the contactor vessel comprises percolating the cleansing gas leaving the contactor vessel through a salt solution held in a drying vessel.

Embodiment 21: The process of Embodiment 20, further comprising: removing a portion of the salt solution from the drying vessel; and adding fresh salt to the salt solution held in the drying vessel.

Embodiment 22: The process of any one of Embodiment 19 to Embodiment 21, wherein drying the cleansing gas leaving the contactor vessel comprises compressing the gas.

The horizontal cross flow contactor for removing volatile contaminates form a liquid may comprise one of or combination of Embodiment 23 to Embodiment 36.

Embodiment 23: A horizontal cross flow contactor comprising: a horizontal contactor vessel having a first end, a second end opposite the first end, a longitudinal axis, a bottom region, and configured to permit a cross flow of a liquid; a liquid inlet at the first end of the horizontal contactor vessel; a liquid outlet at the second end of the horizontal contactor vessel; a cleansing gas distribution grid within the bottom region of the horizontal contactor vessel and disposed within a central area on a cross section of the horizontal contactor vessel parallel to the longitudinal axis of the horizontal contactor vessel; and a gas outlet within an upper region of the horizontal contactor vessel.

Embodiment 24: The horizontal cross flow contactor of Embodiment 23, wherein cross current gas distribution grid comprises a plurality of bayonet spargers arranged parallel to at least a portion of the longitudinal axis of the horizontal contactor vessel, each bayonet sparger of the plurality comprising: a longitudinal axis; a non-porous body; and a porous portion substantially parallel with the longitudinal axis of the bayonet sparger.

Embodiment 25: The horizontal cross flow contactor of Embodiment 24, wherein the porous portions of the plurality of bayonet spargers comprise pores of approximately 5-100 microns in size.

Embodiment 26: The horizontal cross flow contactor of any one of Embodiment 23 to Embodiment 25, wherein the central area is approximately fifty percent of the cross section of the horizontal contactor vessel parallel to the longitudinal axis.

Embodiment 27: The horizontal cross flow contactor of any one of Embodiment 23 to Embodiment 26, further comprising: a diameter; a length; and a length to diameter ratio of approximately 4 or greater.

Embodiment 28: The horizontal cross flow contactor of Embodiment 27, wherein the length to diameter ratio is approximately 8.

Embodiment 29: The horizontal cross flow contactor of Embodiment 27 or Embodiment 28, wherein the diameter is approximately 3 to 4 feet.

Embodiment 30: The horizontal cross flow contactor of Embodiment 27 or Embodiment 28, wherein the diameter is approximately 2 feet.

Embodiment 31: The horizontal cross flow contactor of any one of Embodiment 23 to Embodiment 30, further comprising a crinkle wire mesh at the gas outlet.

Embodiment 32: The horizontal cross flow contactor of any one of Embodiment 23 to Embodiment 31, further comprising: a drying vessel comprising: a bottom region; a wet gas distribution grid within the bottom region; and an upper outlet; a conduit operatively connecting the gas outlet of the horizontal contactor vessel to the wet gas distribution grid; and a conduit operatively connecting the upper outlet to the cleansing gas distribution grid.

Embodiment 33: The horizontal cross flow contactor of Embodiment 32, further comprising a crinkle wire mesh screen at the upper outlet of the drying vessel.

Embodiment 34: The horizontal cross flow contactor of Embodiment 32 or Embodiment 33, wherein the gas drying vessel further comprises longitudinal axis, and wherein the wet gas distribution grid comprises a plurality of spargers arranged parallel to a least a portion of the longitudinal axis of the gas drying vessel.

Embodiment 35: The horizontal cross flow contactor of any one of Embodiment 32 to Embodiment 34, further comprising a tote tank operatively connected to the second horizontal vessel.

Embodiment 36: The horizontal cross flow contactor of any one of Embodiment 23 to Embodiment 35, further comprising: a coalescer operatively connected to the liquid inlet at the first end of the horizontal contactor vessel; and a filter operatively connected to the coalescer.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A process for removing volatile contaminants from a liquid comprising:
    cross flowing a liquid through a contactor vessel comprising:
        a longitudinal axis;
        a bottom region;
        a cleansing gas distribution grid within the bottom region of the contactor vessel that is disposed within a central area on a cross section of the contactor vessel parallel to the longitudinal axis of the contactor vessel; and
        a gas outlet within an upper region of the contactor vessel; and
    contacting the cross flowing liquid with a cross current cleansing gas;
    inducing a radial flow pattern in the cross flowing liquid;
    allowing the cleansing gas to leave the contactor vessel after percolating upwards through the cross flowing liquid; and drying the cleansing gas leaving the contactor vessel by passing the cleansing gas through a gas drying vessel, wherein the gas drying vessel comprises:
  a bottom region;
  a wet gas distribution grid within the bottom region;
  an upper outlet;
  a conduit operatively connecting the gas outlet of the contactor vessel to the wet gas distribution grid; and
a conduit operatively connecting the upper outlet to the cleansing gas distribution grid.

2. The process of claim 1, wherein the contactor vessel further comprises a periphery, and the radial flow pattern induced in the liquid comprises movement of the liquid towards the periphery of the contactor vessel.

3. The process of claim 1, wherein contacting the cross flowing liquid with the cross current cleansing gas comprises introducing the cleansing gas at the bottom region of the contactor vessel along at least a portion of the longitudinal axis of the contactor vessel.

4. The process of claim 3, wherein the cleansing gas is introduced on a cross section of the contactor vessel parallel to the longitudinal axis of the contactor vessel.

5. The process of claim 3, wherein the cleansing gas is introduced from a central area on a cross section of the contactor vessel parallel to the longitudinal axis of the contactor vessel.

6. The process of claim 1, wherein the cleansing gas is introduced from approximately fifty percent of a cross section of the contactor vessel parallel to the longitudinal axis of the contactor vessel.

7. The process of claim 1, wherein the cleansing gas is introduced in the form of a plurality of bubbles.

8. The process of claim 1, wherein drying the cleansing gas leaving the contactor vessel comprises percolating the cleansing gas leaving the contactor vessel through a salt solution held in the gas drying vessel.

9. The process of claim 8, further comprising:
  removing a portion of the salt solution from the drying vessel; and
  adding fresh salt to the salt solution held in the drying vessel.

10. A horizontal cross flow contactor comprising:
  a horizontal contactor vessel comprising:
    a first end;
    a second end opposite the first end;
    a longitudinal axis; and
    a bottom region;
    wherein the horizontal contactor vessel is configured to permit a cross flow of liquid;
  a liquid inlet at the first end of the horizontal contactor vessel;
  a liquid outlet at the second end of the horizontal contactor vessel;
  a cleansing gas distribution grid within the bottom region of the horizontal contactor vessel that is disposed within a central area on a cross section of the horizontal contactor vessel parallel to the longitudinal axis of the horizontal contactor vessel;
  a gas outlet within an upper region of the horizontal contactor vessel; and
  a gas drying vessel, the gas drying vessel comprising:
    a bottom region;
    a wet gas distribution grid within the bottom region;
    an upper outlet;
    a conduit operatively connecting the gas outlet of the horizontal contactor vessel to the wet gas distribution grid; and
    a conduit operatively connecting the upper outlet to the cleansing gas distribution grid.

11. The horizontal cross flow contactor of claim 10, wherein the cleansing gas distribution grid comprises a plurality of bayonet spargers arranged parallel to a least a portion of the longitudinal axis of the horizontal contactor vessel, each bayonet sparger of the plurality comprising:
  a longitudinal axis;
  a non-porous body; and
  a porous portion substantially parallel with the longitudinal axis of the bayonet sparger.

12. The horizontal cross flow contactor of claim 11, wherein the porous portions of the plurality of bayonet spargers comprise pores of approximately 5-100 microns in size.

13. The horizontal cross flow contactor of claim 10, further comprising a crinkle wire mesh screen at the gas outlet.

14. The horizontal cross flow contactor of claim 10, wherein the central area is approximately fifty percent of the cross section of the horizontal contactor vessel parallel to the longitudinal axis.

15. The horizontal cross flow contractor of claim 10, further comprising:
  a coalescer operatively connected to the liquid inlet at the first end of the horizontal contactor vessel; and
  a filter operatively connected to the coalescer.

16. The horizontal cross flow contactor of claim 10, further comprising a crinkle wire mesh screen at the upper outlet of the drying vessel.

17. The horizontal cross flow contractor of claim 10, wherein the gas drying vessel further comprises longitudinal axis, and wherein the wet gas distribution grid comprises a plurality of spargers arranged parallel to a least a portion of the longitudinal axis of the gas drying vessel.

18. The horizontal cross flow contactor of claim 10, further comprising a tote tank operatively connected to the gas drying vessel.

* * * * *